Sept. 6, 1955      A. B. HULSE, JR      2,717,140

CLAMP FASTENERS

Filed July 23, 1949

INVENTOR.
Alexander B. Hulse, Jr.
BY

*Hastings Ackley*

ATTORNEY

United States Patent Office 2,717,140
Patented Sept. 6, 1955

2,717,140
CLAMP FASTENERS
Alexander B. Hulse, Jr., Dallas, Tex.

Application July 23, 1949, Serial No. 106,421

7 Claims. (Cl. 248—223)

This invention relates to new and useful improvements in clamp fasteners.

One object of the invention is to provide a clamp fastener wherein a lever member is provided with a spiral wedge convergent toward a shaft on which the lever member is rotatable, said spiral wedge being engageable in an opening in a latch member, whereby rotation of the lever causes the spiral wedge to draw the latch member toward the shaft to clamp the frame carrying the shaft securely to the object carrying the latch member.

Another object of the invention is to provide a clamp fastener of the character described wherein the frame carrying the shaft upon which the lever arm is rotated is provided with a resilient section, whereby the lever arm is tightly resiliently held in clamping position.

A further object of the invention is to provide a clamp fastener of the character described wherein the spiral wedge of the lever member curves inwardly toward the shaft upon which the lever is rotatable, the innermost portion of said spiral wedge section being formed with a small curved portion concentric with the shaft on which the lever is pivoted, said concentric portion being engageable with the latch member when the lever member is moved to fastening position, whereby the lever member is held against undesired pivotal movement and the parts of the fastener are locked together.

Still another object of the invention is to provide a clamp fastener of the character described wherein the frame supporting the shaft for the lever is formed with means for supporting various objects.

A still further object of the invention is to provide a clamp fastener of the character described wherein the lever arm is itself provided with means for supporting objects when in clamped position.

Another object of the invention is to provide a clamp fastener wherein an object to be supported is securely clamped between the frame and the cam surface of the lever arm, so as to be positively held in place therebetween.

Figure 2:
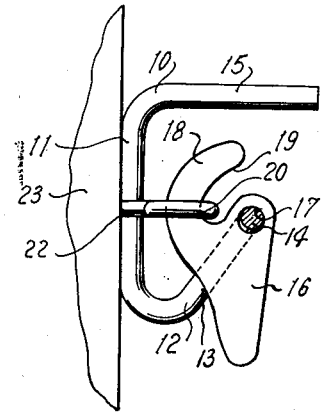
Figure 1:
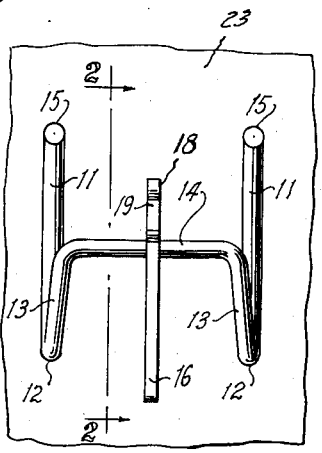
Figure 3:
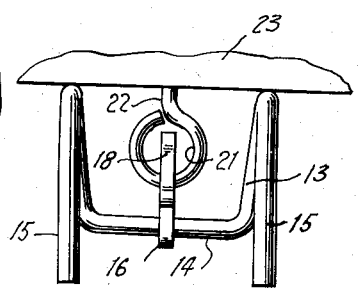
Figure 4:
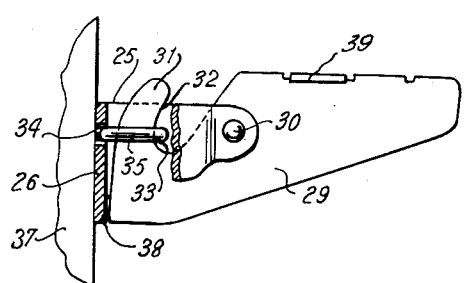
Figure 5:
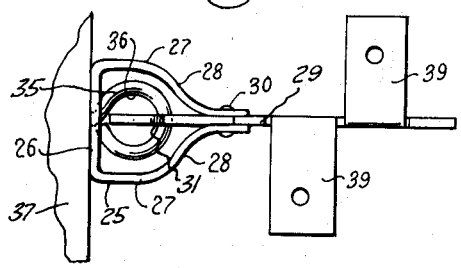
Figure 6:
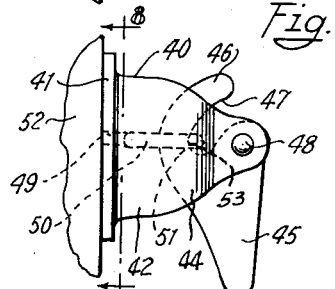
Figure 7:
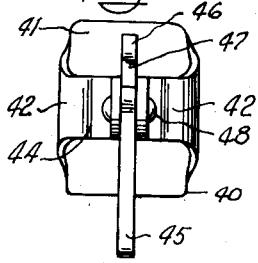
Figure 8:
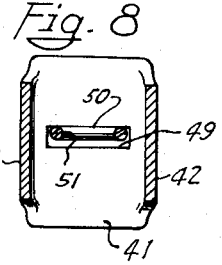
Figure 9:
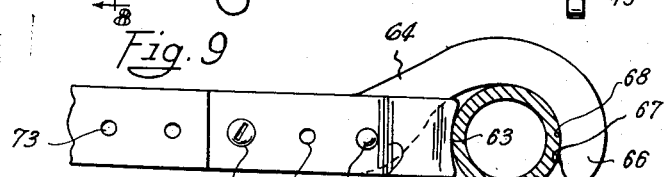
Figure 10:
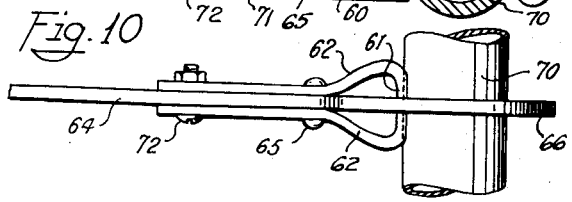

Additional objects and advantages of the invention will readily be apparent from the reading of the following description of devices constructed in accordance with the invention, and reference to the accompanying drawings thereof, wherein:

Figure 1 is a plan view of a clamp fastener constructed in accordance with the invention, Figure 2 is a transverse vertical sectional view taken on the line 2—2 of Figure 1, Figure 3 is a top end view of the clamping device of Figure 1, Figure 4 is a view, partly in elevation and partly in section, of a modified form of the clamp fastener, and showing supporting means on the lever arm for supporting objects on the clamp, Figure 5 is a top end view of the device of Figure 4, Figure 6 is a side elevation of still another form of the clamp fastener, Figure 7 is a front plan view of the form of the clamp fastener of Figure 6, Figure 8 is a transverse sectional view on the line 8—8 of Figure 6, Figure 9 is a side elevation of a still further modification of the clamp fastener, and Figure 10 is a top plan view of the fastener of Figure 9.

In the drawings, the numeral 10 designates generally a frame member of a clamp fastener, said frame member being in the form of an elongate wire bent to provide a pair of spaced substantially parallel base portions 11 and having a reverse bend 12 adjacent each base portion forming resilient supporting arms 13 which carry at their inner ends a transverse shaft section 14. The parts of the frame just described are preferably formed of a single piece of resilient metallic rod bent upon itself in the shape described and illustrated in Figures 1 through 3. If desired, the ends of the base members 11 opposite the reverse pins 12 may be bent at substantially right angles to the base members to provide supporting legs 15 by means of which articles of various kinds may be supported by the fastener.

A lever member 16 is pivotally mounted on the transverse shaft section 14 of the base member, said lever member being provided with an opening 17 which fits over such shaft portion. Formed in the lever member adjacent the opening 17 is a hook member 18, said hook member having a spiral wedge surface 19 curving inwardly with a decreasing radius about the opening 17 as a center. At the extreme inner end of the wedge surface, the spiral curve is transformed into a curved portion 20 which is concentric with the opening 17 in the lever, for a purpose which will be hereinafter more fully explained.

The hook 18 having the spiral wedge 19 thereon is adapted to be inserted through an opening 21 in a latch member 22 secured to a support member 23 to which the frame of the clamp is arranged to be releasably secured. In the form of the invention illustrated in Figures 1 through 3, the latch member is in the form of an eyelet screw having an eyelet opening 21 in one end thereof, and screw threaded into the support member 23 so as to be securely affixed thereto.

The hook of the lever member is arranged to enter the eyelet opening when the frame 10 is positioned on the support member 23 in the manner shown in the drawings, with the shaft portion 14 of the frame positioned in substantially axial alignment with the outer end of the eye screw latch member. The lever arm may then be swung to move the hook portion of the lever arm through the eyelet opening, whereupon the wedge surface 19 will engage the outer portion of the eyelet opening, and draw the shaft of the clamp frame inwardly toward the latch eye screw. The wedging action thus obtained will securely press the base members 11 of the frame against the support member.

When the lever arm has been swung to substantially the position shown in Figure 1, the concentric portion 20 of the curve of the wedge surface of the hook engages the latch at the eyelet opening, whereupon the wedge action terminates and forces attempting to pivot the lever arm in either direction about the shaft are equalized, since the forces act directly from the center of the shaft through the concentric portion of the wedge surface to the eyelet latch member. Thus, the lever arm will remain in fastened position, holding the frame securely clamped against the support member.

Since the arms 13 of the frame have been resiliently moved toward the support member when the shaft has been moved inwardly by the action of the wedge surface on the hook, it will be seen that the frame is positively resiliently secured in fastened position against the support member, and the legs 15 may be utilized for supporting various objects, such as platforms, rods, racks and the like.

To release the frame from the support member, the lever arm is turned in the opposite direction to withdraw the hook from engagement in the eyelet opening of the latch eyelet member, whereupon the spiral wedge surface permits the shaft section of the frame to move outwardly to permit the frame to be released from clamping engagement with the support member. When the hook has been completely disengaged from the eyelet opening, the frame and lever member may be lifted from the support member.

A modified form of the clamp fastener is illustrated in Figures 4 and 5, wherein the frame 25 is formed with a substantially flat base portion 26 and a pair of spaced arm portions 27 extending outwardly from said base portion at substantially right angles thereto and then converging inwardly toward each other to provide resilient sections 28 on each arm. The extreme outer ends of the arms are then bent parallel to each other and in slightly spaced relationship, whereby an elongate lever arm 29 may be pivotally mounted therebetween on a pin or rivet 30, as clearly shown in Figure 5.

The elongate lever arm is provided at one end with a hook member 31 having a spiral wedge surface 32 formed thereon which is inwardly convergent with a lessening radius centering about the pivot pin 30, in the same manner as the wedge surface 19 of the form first described. At the extreme inner end of the wedge surface the curve is provided with a locking portion 33 which is concentric with the pivot pin 30, in the same manner as the concentric locking portion 20 of the form first described.

The flat base portion 26 of the frame is provided with a transverse slot 34 located in a plane extending perpendicular to the base member through the pivot pin, and a latch member 35 having an opening 36 formed therein is adapted to extend through the opening and be engaged by the hook member 31 on the lever, in the same manner as the latch member of the form first described. The latch member 35 is shown as being in the form of an eyelet screw which is screw threaded into a support member 37 against which the base member is to be clamped.

When the base member has been positioned so that the eyelet latch member 35 extends through the opening 34 in the base member of the frame, the lever arm may be swung to move the hook member 31 through the eyelet opening of said latch member. The wedge surface 32 of the hook member will engage the outer portion of the eyelet opening and draw the pivot pin 30 downwardly as such wedge surface is moved by the lever arm. When the lever arm has been moved through a sufficient arc to bring the concentric latching portion 33 of the wedge surface into engagement with the opening in the latch member, the lever arm may be released, whereupon the parts will remain in such latched position because of the balance of forces preventing pivotal movement of the lever in the same manner as the form first described. The resilient portions 28 of the arms are yieldable to permit the pivot pin 30 to be drawn toward the latch member by the wedge, to positively resiliently hold the frame 25 in engagement with the supporting member 37. If desired, the lever member may be provided with an abutment surface 38 which is so disposed that it will abut against the base portion 26 of the frame when the lever arm is moved into latching position and the concentric portion 33 of the wedge surface is in engagement with the latch member. This abutment surface provides for supporting the outer end of the lever arm when articles are supported on said lever arm. If desired, the lever arm may be formed with a pair of oppositely directed supporting and securing wings 39 by means of which a supporting platform may be secured to the lever arm so as to be supported by the clamping fastener.

A further slightly modified form of the invention is illustrated in Figures 6 and 7. In this form of the invention the frame member 40 is provided with a large substantially flat base portion 41 having resilient arms 42 extending vertically outwardly on opposite sides of the base member and converging inwardly to form resilient portions 44. The extreme outer portions of the arms are then bent parallel to each other in slightly spaced relationship and are adapted to receive a lever member 45, substantially identical to the lever member 16 of the form first described, which is pivotally mounted on a pin or rivet 48 extending through the arm ends and lever. The lever member is provided with a hook member 46 having a spiral wedge surface 47 formed thereon. The wedge surface is convergent inwardly with a decreasing radius about the pivot pin 48 on which the lever arm 45 is pivotally supported. At the extreme inner end of the curved wedge surface, the curve is formed with a latch portion 53 concentric with the pivot pin 48, in the same manner as the concentric latching portion 20 of the form first described. The base portion 41 of the frame is provided with a central transverse opening 49 through which a latch member 50 having an opening 51 therein may extend so as to be engaged by the hook member 46 of the lever arm. In use, the base member is positioned over the latch member so that the latch member extends inwardly through the opening 49 and is in position to be engaged by the hook member 46 on the lever arm. When the lever arm is swung, the wedge surface 47 on the hook member engages in the opening 51 in the latch member to securely resiliently clamp the frame 40 to the support 52 into which the latch member 50 is screw threaded. When the concentric latch portion of the curved wedge surface is moved into engagement with the eyelet opening of the latch member, the lever arm remains in latching position. The frame 40 is thus positively resiliently latched in engagement with the supporting member 52 in the same manner as was the frame of the previous form of the invention.

A still further modification of the invention is shown in Figures 9 and 10, and is particularly adapted for resiliently clamping and supporting conduits and the like.

In this form of the invention, the frame 60 is provided with a base portion 61 having a pair of opposed outwardly extending arms 62 formed integral therewith. The base portion 61 of the frame is preferably formed with a concave cylindrical surface 63 extending between the arms on each side of such base member. The arms extend outwardly from the base portion and then converge inwardly toward each other to form resilient supporting portions in the same manner as the form just described. The outer portions of the arms are then bent parallel to each other and are spaced apart to receive an elongate clamping lever arm 64 which is pivotally mounted on a pin or rivet 65 extending through the arms and lever.

The elongate lever arm is bent outwardly adjacent the pivot pin 65 and extends beyond and around the base portion 61 of the frame to provide a large hook member 66. The hook member has a spiral wedge surface 67 formed thereon which is inwardly convergent with a lessening radius centering about the pivot pin 65. Spaced inwardly from the end of the hook member, the curve of the wedge surface is formed concentric with the pivot pin to provide a locking portion 68 similar to the locking portion of the hooks of the forms previously described.

In use, the concave cylindrical portion 63 of the base member is placed against a pipe or conduit 70 and the hook is then swung to bring the wedge surface 67 into contact with the conduit to press the same firmly against such concave portion of the base member. The resilient portions of the arms permit the base member to yield as the pipe is clamped between said base member and the hook. When the hook has been swung so that the lever arm 64 is in substantial alignment with the elongate outer portions of the arms of the frame, as shown in Figure 9, the concentric locking portion 68 of the curved wedge surface is brought into engagement with the conduit, whereby the forces acting upon the lever arm are balanced to prevent undesired pivotal movement of the lever in the same manner as the forms of the latching clamp previously described.

Both the lever arm and the arms of the frame are provided with plurality of openings 71 through which bolts 72 may be inserted to form an auxiliary lock positively holding the hook in clamping position, so that the pipe or conduit is positively gripped between the hook and the concave portion of the frame base member and cannot readily be dislodged therefrom.

If desired, the lever arm may extend beyond the ends of the arms of the frame and be provided with additional openings 73 through which screws may be inserted to fasten the lever arm to a supporting wall or other structure. Also, if desired the elongate arms of the frame may extend beyond the end of the lever arm and be provided with openings or flanges (not shown) by means of which the frame may be secured to a supporting wall or other structure. Thus, this form of the clamp may be used for supporting conduit, pipe or other cylindrical objects.

From the foregoing, it will be seen that a clamp fastener has been provided wherein a lever member is formed with a spiral wedge convergent toward a shaft or pivot pin on which the lever member is rotatable, said spiral wedge drawing the member to be clamped toward the shaft to clamp the frame of the fastener carrying the shaft securely to the object being clamped. It is likewise important to note that the spiral wedge of the lever member curves inwardly with a decreasing radius about the center of the pivot pin or shaft upon which the lever arm is rotated, and that a concentric locking portion is formed in the wedge curve which is adapted to engage with the latch member or article being clamped when the lever is moved to fastening position, whereby the lever member is held against undesired pivotal movement and the parts of the fastener are locked together.

It will also be noted that the fastener is provided with a frame having a resilient portion interposed between the base member of the frame and the shaft upon which the lever arm is rotated so that objects clamped with the fastener are positively resiliently held in clamped position.

It will also be seen that the fastener of the invention is adapted for supporting various articles and for clamping various articles together.

The foregoing description of the invention is explanatory only, and changes in the details of the construction illustrated may be made by those skilled in the art, within the scope of the appended claims, without departing from the spirit of the invention.

What I claim and desire to secure by Letters Patent is:

1. A clamp fastener including, a frame having a base portion and resilient supporting arms extending outwardly from said base portion, a lever member pivotally mounted between the outer ends of the arms of the base member, a hook member on said lever member and having a wedge surface formed thereon facing inwardly toward and converging inwardly toward the pivotal mounting of the lever arm and at its inner end having an arcuate latching portion concentric with the pivotal mounting of the lever arm and spaced inwardly toward the pivot from the outer end of the hook wedge surface, said hook member being adapted to engage a latch member having an opening therein for receiving said hook member and said wedge surface being adapted to draw said latch member toward the pivotal mounting of the lever member until the latch member is engaged in the latching portion when said lever member is swung on the pivotal mounting.

2. A clamp fastener including, a frame member having a base portion and resilient arms extending outwardly from said base portion, a lever member pivotally mounted on said arms at a point spaced from the base of the frame, said lever member being disposed to swing on said pivotal mounting in a plane normal to the base portion of the frame member, a hook portion formed on the lever arm spaced from the pivotal mounting and having a spiral wedge surface converging inwardly toward and facing said pivotal mounting and a latching portion at its inner end concentric with said pivotal mounting, and a latch member having an opening therein adapted to receive the hook portion of the lever arm and engage the wedge surface thereon whereby the lever arm may be swung to draw the latch member toward the pivotal mounting of the lever arm, the concentric latching portion of the wedge surface of the hook of the lever arm being disposed to engage the latch member for preventing undesired pivotal movement of the lever member after said latch member has been drawn by the wedge surface toward the pivotal mounting of the lever arm.

3. A clamp fastener including, a frame having a base portion and resilient supporting arms extending outwardly from said base portion in spaced relationship, a pivot shaft carried adjacent the outer ends of said supporting arms and disposed in a plane parallel to said base portion, a lever arm fulcrumed on said pivot shaft and disposed to swing in a plane normal to said base portion, a hook portion formed on said lever arm spaced from the pivot shaft and having a spiral wedge surface thereon converging inwardly toward and facing said pivot shaft, the inner portion of said wedge surface being formed concentric with said pivot shaft to provide a latching portion, and a latch member having an opening engageable by the hook portion of the lever whereby the latch member may be drawn toward the pivot shaft by the wedge surface on said hook portion when the lever arm is swung, the engagement of the concentric latching portion with the latch member preventing undesired pivotal movement of the lever arm on the shaft after said latch member has been drawn by the wedge surface toward the pivotal mounting of the lever arm.

4. A clamp fastener including, a frame having a base portion and resilient supporting arms extending outwardly from said base portion, a pivot member carried by the supporting arms disposed parallel to and spaced outwardly from the the base portion of the frame, a lever member fulcrumed on said pivot member between the arms of the base member for pivotal movement about an axis disposed parallel to the plane of said base portion, a hook member on said lever member having a wedge surface formed thereon converging inwardly toward and facing the pivot member and having an arcuate latching portion concentric with the pivot member and spaced inwardly toward the pivot member from the outer end of the wedge surface of the hook member, said lever member being swingable on the pivot member and adapted to engage and to draw an article to be clamped against the base portion of the frame, the engagement of the concentric latching portion of the hook member with the article being clamped providing for releasably holding the lever member in latching position after the article has been drawn against the base portion of the frame, the resilient arms of the base member providing a resilient support for the lever member.

5. A clamp fastener including, a frame having a base portion and supporting arms extending outwardly from said base portion in spaced relationship, a pivot pin carried adjacent the outer ends of said supporting arms, a lever member fulcrumed on said pivot pin and disposed to swing thereon in a plane normal to the base portion of the frame, the supporting arms being formed to provide a resilient section in said lever arms between the base portion of the frame and the pivot pin whereby the lever member is resiliently supported with respect to the base portion of the frame, a hook member formed on the lever arm spaced from the pivot pin and having a spiral wedge surface thereon converging inwardly toward and facing said pivot pin, the inner portion of said wedge surface being formed concentric with said pivot pin to provide a latching portion, and a latch member having an opening therein and adapted to be positioned between the arms of the frame whereby the hook portion of the lever member may engage in the opening in said latch member to draw the pivot pin toward the base portion of the frame when the lever arm is swung, the engagement of the concentric latching portion of the hook member with the latch member preventing undesired pivotal movement of the lever member on the pivot pin.

6. A clamp fastener including, a frame having a substantially flat rectangular base portion with an opening therein, supporting arms extending outwardly from said base portion in spaced relationship and having a resilient section intermediate their ends, a pivot pin carried adjacent the outer ends of said supporting arms, a lever arm fulcrumed on said pivot pin between the supporting arms and disposed to swing on said pin in a plane normal to the flat base portion of the frame, a hook formed on the lever arm spaced from the pivot pin and having a spiral wedge surface thereon converging inwardly with a decreasing radius toward and facing said pivot pin, the inner portion of said wedge surface being formed concentric with said pivot pin to provide a latching portion, and a latch member having an eyelet opening therein arranged to be connected to a support member and to extend inwardly through the opening in the base portion of the frame to a position between the supporting arms whereby the hook of the lever arm may engage in the eyelet opening of the latch member when the lever arm is swung, the wedge surface on said hook drawing the base member toward the support member to which the latch member is connected, the engagement of the concentric latching portion of the hook wedge surface with the latch member preventing undesired pivotal movement of the lever arm on the shaft, the resilient portions of the supporting arms providing a resilient support for the lever arm whereby the frame is resiliently latched in engagement with the support member.

7. A clamp fastener including, a frame member having a base portion and resilient arms extending outwardly from said base portion, a lever member mounted on said arms at a point spaced from the base of the frame for pivotal movement about an axis parallel to the base of the frame in a plane normal to the base portion of the frame, a hook portion formed on the lever arm spaced from the pivotal mounting and having a spiral wedge converging inwardly toward and facing said pivotal mounting and a latching portion merging with said wedge surface and concentric with said pivotal mounting, and a latch member having an opening therein adapted to receive the hook portion of the lever arm and engage the wedge surface thereon whereby the lever arm may be swung to draw the latch member toward the pivotal mounting of the lever arm, the concentric latching portion of the wedge surface of the hook of the lever arm being disposed to engage the latch member for preventing undesired pivotal movement of the lever member after said latch member has been drawn by said wedge surface toward the pivotal mounting of the lever arm.

References Cited in the file of this patent

UNITED STATES PATENTS

| | | |
|---|---|---|
| 73,193 | Overholtzer | Jan. 7, 1868 |
| 222,241 | Camp | Dec. 2, 1879 |
| 774,229 | Borein | Nov. 8, 1904 |
| 1,077,489 | Parrish | Nov. 4, 1913 |
| 1,892,613 | Edgin | Dec. 27, 1932 |
| 1,954,935 | Karnes | Apr. 17, 1934 |
| 2,123,695 | Elmer | July 12, 1938 |
| 2,426,498 | Franklin | Aug. 26, 1947 |

FOREIGN PATENTS

| | | |
|---|---|---|
| 62,658 | Norway | July 1, 1940 |